(12) United States Patent  
Gallarda et al.

(10) Patent No.: US 7,464,012 B2
(45) Date of Patent: Dec. 9, 2008

(54) SIMPLIFIED PROCESS SIMULATOR

(75) Inventors: Jean Gallarda, Joinville le Pont (FR); Franck Wegrzyn, Maur des Fosses (FR); Antoine Hernandez, Le Plessis-Trevise (FR); Frederic Bonne, Paris (FR); Jan Cobbaut, Denderleeuw (BE)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 328 days.

(21) Appl. No.: 11/274,704

(22) Filed: Nov. 14, 2005

(65) Prior Publication Data

US 2006/0129372 A1 Jun. 15, 2006

(51) Int. Cl.
*G06F 9/455* (2006.01)
(52) U.S. Cl. .............................. 703/6; 703/12; 703/22; 700/30; 700/103; 423/210; 423/239.1
(58) Field of Classification Search .................. 703/22, 703/6, 12; 62/656; 700/103, 30; 166/60; 423/239.1, 210
See application file for complete search history.

(56) References Cited

U.S. PATENT DOCUMENTS

| | | | | |
|---|---|---|---|---|
| 5,315,521 | A * | 5/1994 | Hanson et al. | 700/103 |
| 5,431,023 | A * | 7/1995 | Howard et al. | 62/656 |
| 2003/0065603 | A1* | 4/2003 | Aihara et al. | 705/36 |
| 2003/0157008 | A1* | 8/2003 | Pahlman et al. | 423/239.1 |
| 2004/0006398 | A1* | 1/2004 | Bickford | 700/30 |
| 2004/0109800 | A1* | 6/2004 | Pahlman et al. | 423/210 |
| 2005/0092483 | A1* | 5/2005 | Vinegar et al. | 166/60 |

* cited by examiner

*Primary Examiner*—Kandasamy Thangavelu
(74) *Attorney, Agent, or Firm*—Elwood Haynes

(57) ABSTRACT

Process simulators, including a novel process simulator that utilizes simplified mathematical correlations to predict the performance of equipment or subsystems in a process unit. The process simulator comprises a process correlation that is a mathematical response model for a discrete process system in a process unit. The process correlation is developed by obtaining operating data over a range of operating conditions of the process unit and regressing the operating data to form the mathematical response model. The process simulator calculates a number of output parameters using a number of input parameters. The process simulator outputs the output parameters so they can be used by operating personnel to evaluate the current operations of the process plant and make operating decisions.

19 Claims, 1 Drawing Sheet

SIMPLIFIED PROCESS SIMULATOR

BACKGROUND

The present invention relates to a novel method of simulating a process, and particularly relates to a novel process simulator that utilizes simplified mathematical correlations to predict the performance of equipment or subsystems in a process unit.

Process units, such as syngas or other processes, are typically designed using complex simulation programs that include physical property models and require considerable technical expertise to use. Production split, or production quantities, are often driven by market demands; thus, process units are typically designed to allow a certain flexibility to produce different products or product splits, or to produce products in varying quantities. Process units are also designed with certain optimum operating efficiencies, such as catalyst efficiency, membrane separation efficiency, heat transfer efficiency, compressor load, or a number of other performance parameters that may vary during actual operation of the process plant, or that vary with the age of catalyst, or condition of equipment. Actual operation of these process units can thus vary considerably from design conditions, and from optimum conditions.

To minimize costs, and/or maximize production, real-time simulation models are often used to evaluate the real-time operating efficiency of a process unit and to help make operating decisions. These real-time simulation models are typically customized software applications that apply complex simulation programs that include extensive physical properties models and complex solvers to determine the ideal responses of the process unit to current operating conditions. The operations personnel may then compare the results of these complex models with the actual operating results to determine when to take certain actions, such as cleaning equipment, replacing spent catalyst, replacing fouled membranes, or simply changing the operating conditions of the process plant.

Complex process simulators often are not feasible for small, and/or remote process units, because using these complex simulators requires considerable technical skill, and/or significant computing power. Complex process simulators can cost hundreds of thousands to millions of dollars to purchase and install for a single process unit. Furthermore, the process computer and process software application programs, including the simulation programs, require significant expense to maintain the programs and computing platforms. Further yet, the complex simulators often require a technical person with considerable process knowledge and technical training to properly utilize and maintain. Because of the burden created by these issues, some process operating units, particularly smaller units, cannot take advantage of these complex process simulations to assist with day-to-day operations.

In light of the foregoing problems associated with using complex physical property based simulation models, a need exists for an improved method of simulating a process that uses simplified process models, is affordable to smaller process units, and can be used day to day by operating personnel. Furthermore, there is a need for a process simulator wherein the simulator can be used on personal computers, or control system computers that are readily available to operating personnel.

SUMMARY

The present invention provides a novel process simulator that utilizes simplified mathematical correlations to predict the performance of equipment or subsystems in a process unit. The process simulator of the current invention comprises a process correlation wherein the process correlation is a mathematical response model for a discrete process system in a process unit. The process correlation is developed by obtaining operating data over a range of operating conditions of the process unit and regressing the operating data to form the mathematical response model. Furthermore, the process simulator calculates an output parameter for the discrete process system using a number of input parameters. Finally, the process simulator outputs the output parameters so they can be used by operating personnel to evaluate the operation of the process plant and make operating decisions.

In other embodiments of the invention:
the process correlation is provided on a portable storage media;
the output parameters include one or more predicted production rates of one or more product(s) being produced, a cost of producing the product(s), a utilities usage, and a utilities cost;
the plurality of input parameters comprises an incoming material flow, an incoming material unit cost, and a utility unit cost;
the process simulator comprises a plurality of process correlations wherein the plurality of process correlations are linked such that the output parameter from a first process correlation is an input parameter to a second process correlation;
the input parameters comprise a real-time input parameter, and further comprise the step of comparing the output parameter to a real-time output parameter;
the process unit is a syngas production unit, a nitrogen production unit, or an oxygen production unit;
the process unit is a syngas production unit, and the discrete process system is a steam methane reforming (SMR) system, partial oxidation reaction (POX) system, auto thermal reforming (ATR) system, acid gas removal (AGR) system, $CO_2$ removal system, cold box system, pressure swing absorption (PSA) system, or membrane separation system;
the process simulator comprises a plurality of process correlations wherein the plurality of process correlations are linked such that the output parameter from a first process correlation is an input parameter to a second process correlation;
the process simulator, wherein the process unit is a syngas production unit, a nitrogen production unit, or an oxygen production unit; and
the process simulator, wherein the process unit is a syngas production unit, and the discrete process system is a steam methane reforming (SMR) system, partial oxidation reaction (POX) system, auto thermal reforming (ATR) system, acid gas removal (AGR) system, $CO_2$ removal system, cold box system, pressure swing absorption (PSA) system, or membrane separation system.

An alternative embodiment of the invention provides a method of simulating a process. According to the method, a process simulator is developed using a process correlation for the production of a product, wherein the process correlation is a mathematical response model for a discrete process system in a process unit. The process correlation is developed by obtaining actual or theoretical operating data over a range of operating conditions of the process unit and regressing the operating data to form the mathematical response model. Furthermore, a number of input parameters are inputted into the process simulator to calculate a number of output parameters. In one embodiment, the input parameters comprise an incoming material flow, an incoming material unit cost, and a utility unit cost, and the output parameters include a predicted production rate of the product, a cost of producing the product, a utilities usage, and a utilities cost. The method then outputs the output parameters so they may be utilized by operating personnel.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
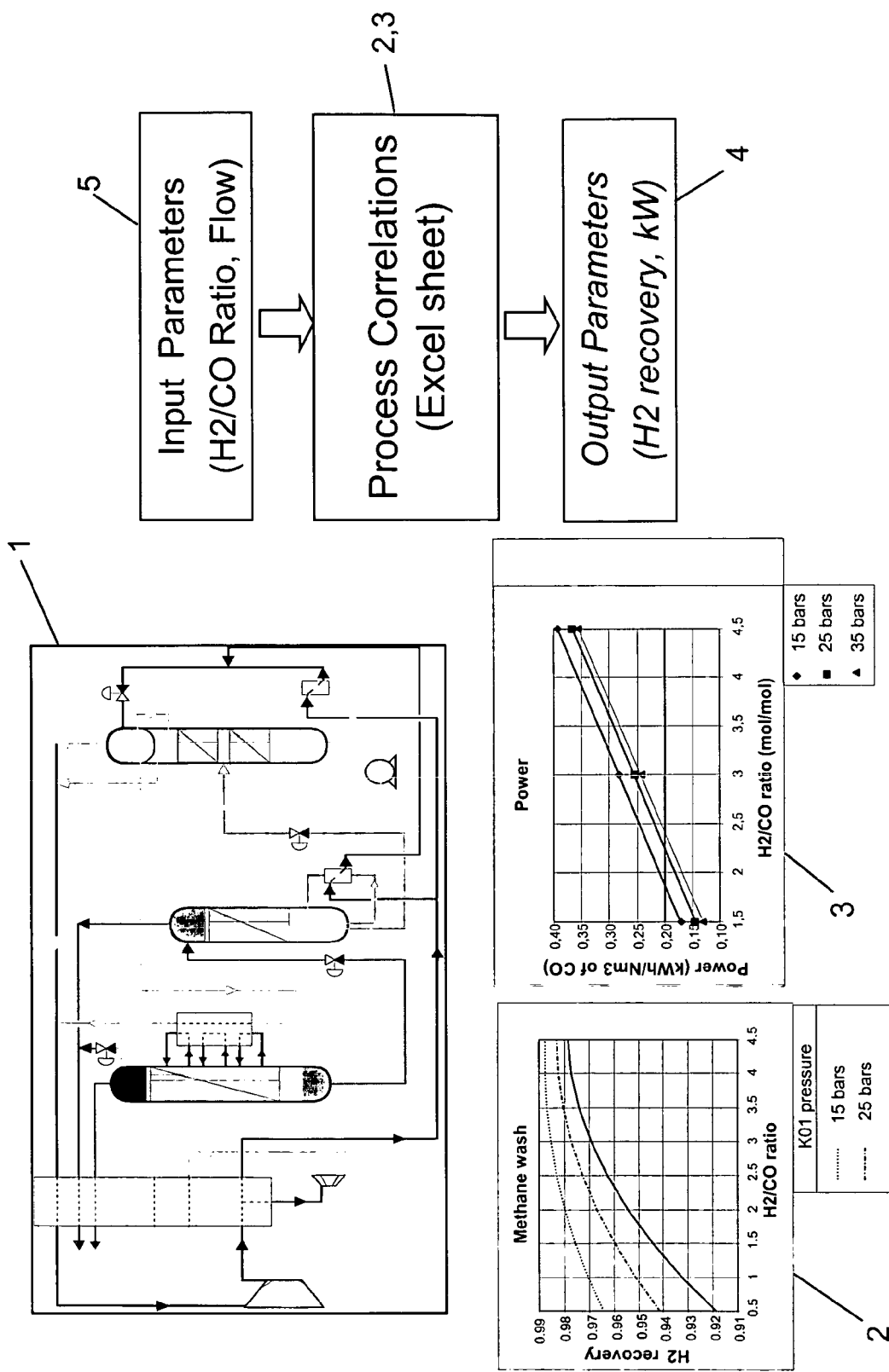
FIG. 1 is a graphical representation of some elements of the invention.

The present invention provides a novel process simulator that utilizes simplified mathematical correlations to predict the performance of equipment or subsystems in a process unit. The process simulator of the current invention comprises a process correlation wherein the process correlation is a mathematical response model for a discrete process system in a process unit. The process correlation is developed by obtaining operating data over a range of operating conditions of the process unit and regressing the operating data to form the mathematical response model. Furthermore, the process simulator calculates a number of output parameters for the discrete process system using a number of input parameters. Finally, the process simulator outputs the output parameters so that operating personnel can use the output parameters to evaluate the operation of the process plant and make operating decisions.

The term "process correlation" as used herein refers to a simplified mathematical model based on actual or theoretical operating data based on the particular process unit being modeled that predicts the response of a discrete operating system to an expected range of inputs. A "process unit" as used herein, refers to any system or subsystem of an operating plant. The term process unit may refer to the entire operating plant as a whole, or a subsystem of the operating plant. For example, and referring to FIG. 1, a syngas production unit may include a cold box/methane wash step to complete the separation of carbon monoxide (CO) and hydrogen ($H_2$). The cold box is a process unit 1, or subsystem, of the larger process unit (the syngas process unit). Process correlations 2, 3 predict the performance of the process unit 1 (the cold box) using simple mathematical models to calculate the output parameters 4 ($H_2$ and CO recovery and power consumption) in response to the given input parameters 5 ($H_2$/CO ratio and pressure). The process simulator may include a number of process correlations that predict the performance of a number of subsystems in a process unit.

In one embodiment, the process correlations of the process simulator are linked, such that the output parameter calculated by one process correlation is the input parameter to another process correlation, just as the output from one subsystem may be the input to another subsystem. This allows a complex process plant to be simulated using a series of process correlations. The complex process plant is broken down into process units or subsystems. Process correlations are developed for each subsystem.

The process correlation is developed by obtaining operating data, preferably actual operating data or theoretical operating data generated by a physical property-based modeling program, over a range of operating conditions of the process unit being simulated and regressing the operating data to form the mathematical response model. This means that instead of using complex physical property models in the process simulator, operating data is used to regress a mathematical representation of the response of the process unit to an input. Preferably, actual operating data is taken over a range of operating conditions. This data represents the real-world response of the process unit. A mathematical regression analysis is then applied to the data, so that a simple mathematical formula is created that represents the response of the process unit to a given set of input parameters. Alternatively, a physical property based process model is used to generate theoretical operating data and the theoretical inputs and outputs are regressed to form a simple mathematical model of the process unit.

The process correlation is developed for a particular process unit in a particular operating plant. That is, the size, flows, and capabilities of the plant are already known. Because the process correlation is for a particular plant, it is possible to approximate the real-world response of the plant for a given set of input parameters with a mathematical model that is a single, or series of, relatively simple mathematical formulas. Because the mathematical formulas are relatively simple, they are small enough to be placed on portable storage media, or embedded into spreadsheets, such as the Microsoft® Excel® application program.

The process correlation of the current invention calculates a single or a number of output parameters for the discrete process system using a single or a number of input parameters. Referring again to FIG. 1 and the cold box example from above, the process correlations 2, 3 predict the recovery of $H_2$ and CO and the power consumed in the cold box based on the feed ratio of the $H_2$/CO mixture to the cold box and the pressure in the cold box. The process correlations 2, 3 may include a single input parameter and a single output parameter, a number of inputs and a number of outputs, or any combination of single and multiple inputs and outputs. In one embodiment of the invention, the output parameters include one or more predicted production rates of one or more product(s) being produced, a cost of producing the product(s), a utilities usage, and a utilities cost.

The process simulator outputs the output parameters so they can be used by operating personnel to evaluate the operation of the process plant and make operating decisions. The outputs are used to crosscheck process parameters during normal operation, and during startup or shutdown procedures. The outputs are also used to optimize the plant operating parameters depending on a particular operating state, such as a particular required product split (often driven by customer demand). Furthermore, the outputs are used to check the performance, efficiencies, and economics of specific process units, as well as the aging of consumable process parts, such as catalysts, adsorbents, and membranes.

The process simulator is also used as a training tool for operations personnel and to evaluate process improvements. The operator may also manually input certain parameters to evaluate the effect of changing certain flows, temperatures, or pressures in the process. Some process improvements are also evaluated using the process simulator. For example, a flow to a certain piece of operating equipment may be limited by a particular piece of equipment. The process simulator can predict the benefits that will result if the flow restriction is removed.

In any embodiment of the current invention, the process simulator may be provided as a spreadsheet file, or series of linked spreadsheet files, that contains the process correlations. In other embodiments, the process correlation is provided on a portable storage media. Any portable media that can contain the simulator program is suitable. For instance, the process simulator may be provided on a magnetic disk, compact disk, or flash media.

In a second embodiment of the invention, the process simulator includes a number of input parameters, which include an incoming material flow, an incoming material unit cost, and a utility unit cost. The incoming material flow is typically expressed as a mass of molar quantity of material per unit of time. The incoming material unit cost is typically expressed as a cost per unit mass or per mole, and the utility costs is typically expressed as a cost per unit of product or output flow.

In a third embodiment of the invention, the process unit is a syngas production unit, a nitrogen production unit, and an oxygen production unit. In another embodiment, the process unit is a syngas production unit, and the discrete process system is a steam methane reforming (SMR) system, partial oxidation reaction (POX) system, auto thermal reforming (ATR) system, acid gas removal (AGR) system, $CO_2$ removal system, cold box system, pressure swing absorption (PSA) system, or membrane separation system.

An alternative embodiment of the invention provides a method of simulating a process. According to the method, a process simulator is developed using a process correlation for the production of a product, wherein the process correlation is a mathematical response model for a discrete process system in a process unit. The process correlation is developed by obtaining actual or theoretical operating data over a range of operating conditions of the process unit and regressing the operating data to form the mathematical response model. Furthermore, a number of input parameters are input into the process simulator to calculate a number of output parameters. The method then outputs the output parameters so they may be utilized by operating personnel.

In a fourth embodiment of the invention, the input parameters comprise an incoming material flow, an incoming material unit cost, and a utility unit cost. In another embodiment, the output parameters include a predicted production rate of the product, a cost of producing the product, a utilities usage, and a utilities cost. In yet another embodiment, the input parameters comprise an incoming material flow, an incoming material unit cost, and a utility unit cost, and the output parameters include a predicted production rate of the product, a cost of producing the product, a utilities usage, and a utilities cost.

In a fifth embodiment of the invention, the method further includes a step of comparing the output parameters to real-time output parameters. In another embodiment, the operating personnel make operating decisions based on the comparison of the output parameters to real-time output parameters. In yet another embodiment, the operating personnel make an operating decision to change an operating condition, placing equipment in service, take equipment out of service, perform maintenance on process equipment, or modify the process unit.

In one embodiment of this method, the process unit is a syngas production unit, a nitrogen production unit, and an oxygen production unit. In another embodiment, the process unit is a syngas production unit, and the discrete process system is a steam methane reforming (SMR) system, partial oxidation reaction (POX) system, auto thermal reforming (ATR) system, acid gas removal (AGR) system, $CO_2$ removal system, cold box system, pressure swing absorption (PSA) system, or membrane separation system.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process simulator system comprising:
a computer with one or more processing units and a memory storing a program of instructions for a process simulator, the process simulator comprising a plurality of process correlations, wherein the process simulator is configured to:
obtain operating data over a range of operating conditions for a plurality of interrelated process units;
determine, for each of the plurality of process units, a regression from the obtained operating data to form a process correlation for each respective process unit, wherein each process correlation is a mathematical response model for a discrete process system in one of the interrelated process units, wherein each process correlation is configured to provide one or more output parameters from one or more input parameters, according to the respective regression, and wherein at least a first process correlation is linked to a second process correlation such that at least one output parameter from the first process correlation is an input parameter to the second process correlation;
calculate, from the first process correlation, a first plurality of output parameters for a first discrete process system using a first plurality of input parameters;
output the first plurality of output parameters as input to the second process correlation;
input, to the second process correlation, the first plurality of output parameters from the first process correlation;
calculate, from the second process correlation, a second plurality of output parameters for a second discrete process system using the first plurality of output parameters as a second plurality of input parameters; and
output, from the second process correlation, the second plurality of output parameters provided by the second process correlation.

2. The process simulator of claim 1, wherein said process simulator is provided as a spreadsheet file.

3. The process simulator of claim 2, wherein said process simulator is provided on a portable storage media.

4. The process simulator of claim 3, wherein said output parameters for each process correlation comprise at least one of:
  a) a predicted production rate of said product;
  b) a cost of producing said product;
  c) a utilities usage; and
  d) a utilities cost.

5. The process simulator of claim 4, wherein said input parameters for each process correlation comprise at least one of said plurality of:
  a) an incoming material flow;
  b) an incoming material unit cost; and
  c) a utility unit cost.

6. The process simulator of claim 1, wherein said input parameters for each process correlation comprise real-time input parameters, and further comprising a step of comparing said output parameters for each process correlation to a real-time output parameters from a corresponding discrete process system.

7. The process simulator of claim 6, wherein at least one of said process units is:
 a) a syngas production unit;
 b) a nitrogen production unit; or
 c) an oxygen production unit.

8. The process simulator of claim 7, wherein at least one of said process units is a syngas production unit, and at least one of said first discrete process system and said second discrete process system is one of:
 a) a steam methane reformer (SMR) system;
 b) a partial oxidation reaction (POX) system;
 c) an auto thermal reforming (ATR) system;
 d) an acid gas removal (AGR) system;
 e) a $CO_2$ removal system;
 f) a cold box system; and
 g) a pressure swing absorption (PSA) system, or a membrane separation system.

9. The process simulator of claim 1, wherein at least one of said process units is:
 a) a syngas production unit;
 b) a nitrogen production unit; and
 c) an oxygen production unit.

10. The process simulator of claim 9, wherein at least one of said process units is a syngas production unit, and at least one of said first discrete process system and said second discrete process system is one of:
 a) a steam methane reformer (SMR) system;
 b) a partial oxidation reaction (POX) system;
 c) an auto thermal reforming (ATR) system;
 d) an acid gas removal AGR) system;
 e) a $CO_2$ removal system;
 f) a cold box system; and
 g) a pressure swing absorption (PSA) system, or a membrane separation system.

11. A computer implemented method of simulating a process using a process simulator comprising the steps of:
 obtaining operating data over a range of operating conditions for a plurality of interrelated process units;
 determining, for each of the plurality of process units, a regression from the obtained operating data to form a process correlation for each respective process unit, wherein each process correlation is a mathematical response model for a discrete process system in a one of the interrelated process units, wherein each process correlation is configured to provide one or more output parameters from one or more input parameters, according to the respective regression, and wherein at least a first process correlation is linked to a second process correlation such that at least one output parameter from the first process correlation is an input parameter to the second process correlation;
 inputting the one or more input parameters to the first process correlation, wherein said input parameters comprise an incoming material flow, an incoming material unit cost, and a utility unit cost;
 calculating, from the first process correlation a first plurality of output parameters;
 outputting, from the first process correlation, said first plurality of output parameters;
 inputting, to the second process correlation, the at least one output parameter of the first plurality of output parameters output from the first process correlation;
 calculating, from the second process correlation, a second plurality of output parameters for a second discrete process system using a plurality of input parameters; and
 outputting, from the second process correlation, the second plurality of output parameters provided by the second process correlation.

12. The method of claim 11 wherein said process simulator is provided in a spreadsheet file.

13. The method of claim 11, wherein said process simulator is provided on a portable storage media.

14. The method of claim 11, wherein said output parameters for each process correlation comprise at least one of:
 a) a predicted production rate of said product;
 b) a cost of producing said product;
 c) a utilities usage; and
 d) a utilities cost.

15. The method of claim 11, wherein said input parameters for each process correlation comprise real-time input parameters, and further comprising a step of comparing said output parameters for each process correlation to a real-time output parameters from a corresponding discrete process system.

16. The method of claim 15, further comprising the step of making an operating decision based on said comparing step.

17. The method of claim 16, wherein said operating decision is a decision of:
 a) changing an operating condition;
 b) placing equipment in service;
 c) taking equipment out of service;
 d) performing maintenance on process equipment; or
 e) modifying said process unit.

18. The method of claim 11, wherein at least one of said process units is:
 a) a syngas production unit;
 b) a nitrogen production unit; and
 c) an oxygen production unit.

19. The method of claim 11, wherein at least one of said process units is a syngas production unit, and at least one of said first discrete process system and said second discrete process system is one of:
 a) a steam methane reformer (SMR) system;
 b) a partial oxidation reaction (POX) system;
 c) an auto thermal reforming (ATR) system;
 d) an acid gas removal (AGR) system;
 e) a $CO_2$ removal system;
 f) a cold box system; and
 g) a pressure swing absorption (PSA) system, or a membrane separation system.

* * * * *

UNITED STATES PATENT AND TRADEMARK OFFICE
CERTIFICATE OF CORRECTION

PATENT NO. : 7,464,012 B2  Page 1 of 1
APPLICATION NO. : 11/274704
DATED : December 9, 2008
INVENTOR(S) : Jean Gallarda et al.

It is certified that error appears in the above-identified patent and that said Letters Patent is hereby corrected as shown below:

On the Title page of the patent, in the Bibliographic Data, insert
--Related U.S. Application Data
Provisional application No. 60/634,935, filed on December 10, 2004--.

In Column 6, line 63, remove the words "said plurality of".

In Column 7, line 36, replace "AGR)" with --(AGR)--.

In Column 8, line 31, replace the word "the" with the word --a--.

Signed and Sealed this

Fourth Day of May, 2010

David J. Kappos
*Director of the United States Patent and Trademark Office*